June 7, 1960 E. R. POWELL 2,939,680
BALANCER LOWERING ASSIST
Filed Jan. 2, 1952 3 Sheets-Sheet 1

Inventor
Edgar R. Powell
By Willits, Helwig & Baillio
Attorneys

June 7, 1960

E. R. POWELL 2,939,680

BALANCER LOWERING ASSIST

Filed Jan. 2, 1952

Inventor
Edgar R. Powell
By Willits, Helwig & Baillio
Attorneys

United States Patent Office 2,939,680
Patented June 7, 1960

2,939,680

BALANCER LOWERING ASSIST

Edgar R. Powell, Park Forest, Ill., assignor to General Motors Corporation, Detroit, Mich., a corporation of Delaware Filed Jan. 2, 1952, Ser. No. 264,613

19 Claims. (Cl. 254—168)

The present invention relates to balancers which are used as an aid in the handling of materials and more particularly it relates to power operated spring balancers which are adapted to repeatedly handle a plurality of loads having substantially identical weights.

Conventional power hoists utilized heretofore to move objects, possess several disadvantages. In the absence of elaborate controls or variable speed transmissions it is difficult, if not impossible to start and stop the hoist motor without jarring the load. Spring or other counterbalancing devices for handling loads employed heretofore while facilitating the movement of the load from one position to another possess the disadvantage of requiring the operator thereof to manually establish the balanced condition each time a new load is handled. Considerable physical effort on the part of the operator is accordingly required in the use of such load counterbalancing devices.

It is an object of the invention to provide a load balancer that embodies the floating features of a mechanical balancer and at the same time incorporates the effortless operation of a power hoist.

It is another object to provide a load balancer in which a balanced condition will be maintained at all times regardless of whether the balancer is loaded or unloaded.

It is a further object to provide a balancer in which the balanced condition will be established by an independent source of power rather than by the physical effort of the operator.

It is a still further object to provide a means for handling objects which enables complete control of the objects handled with a minimum of effort on the part of the operator.

These and other objects and advantages will become more apparent from the specification, claims and drawings, wherein:

Fig. 2 is an elevation view partly in section of the load balancer illustrated in Fig. 1.

Figure 1:
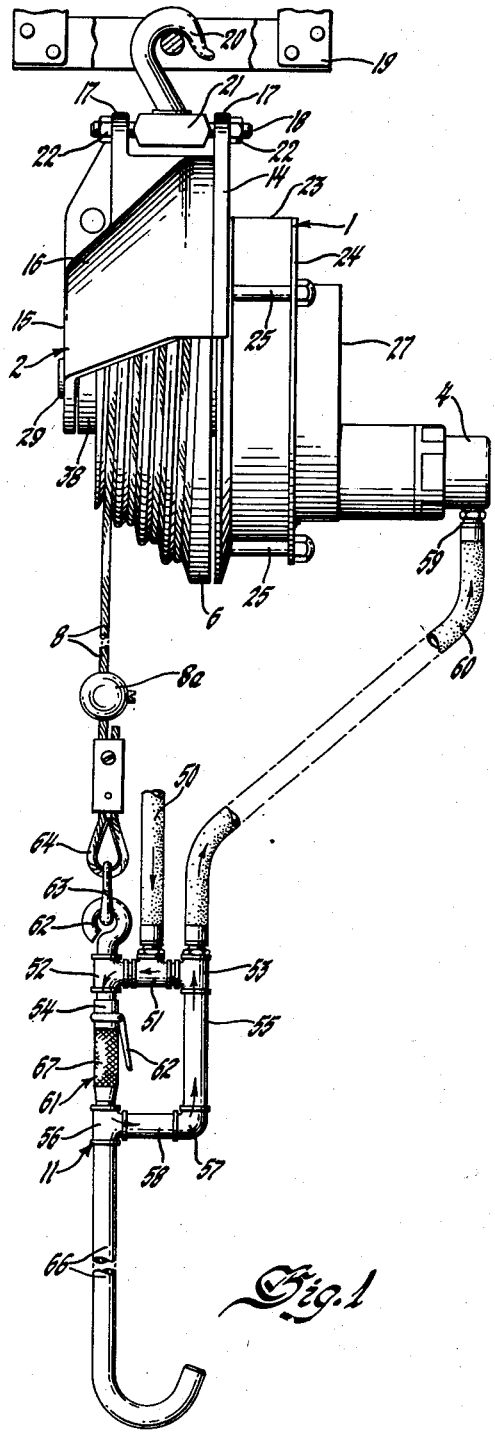
Fig. 1 is a side elevational view of a load balancer embodying a preferred form of the present invention.

Referring to the drawings, the numeral 1 indicates generally a direct acting type of load balancer consisting essentially of a supporting frame 2 having mounted thereon a shaft 3, a fluid motor 4 operatively connected to said shaft, a drum or reel 6 about which a load supporting cable 8 is wound, a load counterbalancing spring 10, and a combination hook and fluid control system for motor 4 indicated generally at 11. Frame 2 may comprise an iron casting or be of fabricated steel construction and consists of an enlarged annular plate portion 14, a reduced portion 15 spaced therefrom and an inclined portion 16 extending between portions 14 and 15. Inclined portion 16 extends over a portion of reel 6 and forms a shield for the latter as well as constituting a tying support for the spaced portions 14 and 15. A pair of spaced ears 17 extend upwardly from casing 2 and have aligned apertures provided therein for receiving a threaded bolt 18. Frame 2 may be suspended from an overhead support 19 by a hook 20. Hook 20 is swivelled on or otherwise connected to a supporting block 21 having a threaded bore therein for receiving bolt 18. Lock nuts 22 provided at either end of bolt 18 prevent endwise movement of the latter.

Annular plate portion 14 has formed thereon an annular flange 23 which houses counterbalancing spring 10.

The outer side of flange or housing 23 is partially closed by an annular plate 24. Plate 24 is held securely in position by a series of bolts 25 which make threaded engagement with the internally tapped openings 26 provided in the annular plate portion 14 of frame 2. A cup-shaped supporting bracket 27 for motor 4 is secured to annular plate 24 by welding as shown at 28.

One end of shaft 3 is journalled in any suitable bearing 29 provided centrally of the reduced portion 15 of frame 2. The other reduced end 30 of shaft 3 has keyed thereto a gear 31 which meshes with a pinion 32 secured to the shaft (not shown) of fluid motor 4. The hub 34 of gear 31 is journalled in a plain bearing 36 provided in an annular recess 37 disposed centrally of bracket 27. Drum or reel 6 is of substantially frusto-conical construction and the hub 38 thereof is keyed or otherwise secured to shaft 3.

Spring 10 is of spiral construction and the inner end thereof is secured by machine screws 40 to a sleeve 42 secured to shaft 3 and extending between the hub 38 of drum 6 and the inner side of gear 31. The other or outer end of spring 10 is secured by machine screws 44 to the annular flange 23 of frame 2. It therefore is seen that upon rotation of shaft 3 in one direction spring 10 will be wound about said shaft and upon movement of said shaft in the reverse direction unwinding of said spring is effected. It is also seen that when shaft 3 is rotated in the spring winding direction, the cable 8 will be payed off drum 6, and upon rotation of said shaft in the reverse direction the said cable is wound on the said drum.

The lower end of bracket 27 is provided with a relatively large internally threaded opening 46 for receiving the externally threaded end 47 of the casing 48 of fluid motor 4. Motor 4 may be of any suitable rotary type operable by air pressure and is so designed as to wind spring 10 to such an extent that it will sustain a predetermined load, as will appear more fully hereinafter.

The fluid system 11 for supplying fluid pressure to motor 4 and for controlling the flow of pressure thereto comprises a flexible pipe connection 50 connected at one end to a source of supply (not shown) and at the other end to a horizontally disposed T-pipe fitting 51 which in turn is operatively connected to a pair of spaced T-pipe fittings 52 and 53 provided at the upper ends of vertically disposed pipes 54 and 55, respectively. The lower ends of pipes 54 and 55 are connected to T-pipe fitting 56 and elbow 57, respectively, which in turn are connnected by a horizontally disposed pipe section 58. The upper end of fitting 53 is connected to the inlet fitting 59 of motor 4 by a flexible hose 60. A valve 61 is provided in pipe 54 which normally connects motor 4 to exhaust and at the same time shuts off the fluid supply to said motor. Valve 61 is operated by a lever 62 which when actuated against pipe 54 connects motor 4 to the source of fluid supply. In some constructions valve 61 might be of the one-way type which normally shuts off the flow of air to and from motor 4, but which connects the said motor to the source when the lever 62 is actuated toward pipe 54 as in the previous case. When a one-way valve of this type is employed, by simply raising the load slightly after the spring has been wound, as previously described, the said spring will tend to rotate the motor in the reverse direction thereby exhausting any fluid pressure in the latter and in hose 60. When the load has been removed spring 10 will wind the cable on drum 6.

Pipe fitting 52 has secured to the upper end thereof an eye bolt 62 which is connected by a link 63 to a loop 64 provided at the lower end of cable 8. The lower end of fitting 56 has secured thereto in any suitable manner a load hook 66. T-fitting 51 may be plugged at the right hand end (Fig. 1) thereof so that air pressure will flow in the direction of the arrows when valve 61 is actuated to open position by lever 62. Pipe 54 may be provided with a knurled portion as shown at 67 to form a better hand grip for the operator.

To operate the balancer 1, the operator grasps hand grip 67 and actuates valve lever 62 toward pipe 54. Fluid pressure from flexible pipe 50 now flows to motor 4 through fittings 51 and 52, valve 61 and pipe 54, fitting 56, pipe 58, fitting 57, pipe 55, fitting 53 and flexible hose 60 causing the motor 4 to tend to rotate shaft 3 through gears 31 and 32. If the motor is strong enough it will also rotate drum 6 and unwind cable 8. Upon the application of this torque, which opposes the tension of spring 10, the unloaded hook and valve assembly will be balanced by the spring and motor or will be payed out as the motor overcomes the spring tension. During this condition the operator can easily reel the cable from drum 6 or, if a stronger motor is used, the cable will be payed out by the motor. It is desirable, although not necessary, to select a motor of such power that it will, with the aid of the weight of the empty hook and associated parts attached thereto, just overcome the present pressure of spring 10. Under these conditions undue slack will not occur in the cable while being payed off the drum.

In order to prevent damage to the cable and associated parts when the spring 10 is preset to counterbalance a given load, a ball stop 8a is adjustably secured to cable 8 near the point of attachment of the latter to hook and valve structure 11. When the cable 8 is fully wound on drum 6 ball 8a engages the said drum and the inclined portion 16 of frame 2, thereby preventing further travel of said cable.

The spring 10 is designed to counterbalance a predetermined load irrespective of the extent to which the shaft 3 is turned within the limits of movement thereof. This is accomplished by providing a drum of frusto-conical construction. When the cable 8 is fully wound on drum 6, the pressure of spring 10 by presetting is just sufficient to overcome the weight of the hook 66, the predetermined weight of the load to be handled thereby and the weight of the various pipe connections attached thereto. At this time the moment arm caused by the force on cable 8 tending to rotate the drum against the action of spring 10 is relatively short. As the drum 6 turns to pay out the cable, the moment arm progressively increases in length to compensate for the increase in pressure of spring 10 as the spring is wound up. When the cable has been payed out to its fullest extent the moment arm tending to counteract the spring 10 is at its greatest length. It therefore is seen that irrespective of the position of cable 8 or drum 6 the counterbalancing force exerted on the load by spring 10 remains substantially the same.

When the hook 66 has been lowered the desired amount, the operator attaches the load thereto and releases valve lever 62. Valve 61 now shuts off the pressure to motor 4 and at the same time connects the latter to exhaust. Spring 10 now counterbalances the load and the operator may move it from place to place with substantially no effort. Should it be desired to raise the load, this may be done with a minimum of effort by exerting a slight upward force on the load. This causes the spring 10 to wind in cable and at the same time rotate shaft 3 and motor 4 in the reverse direction. Should the previously referred to one way valve be used this reverse movement immediately exhausts any pressure in motor 4 and substantially no resistance is then encountered in either the raising or lowering movements of the load. When the desired elevation has been obtained the load will remain in that position by the counterbalancing action of spring 10, as previously described. When the load is released from hook 66, spring 10 will rotate drum 6 to wind in cable and return the hook to fully raised position.

Figure 3:
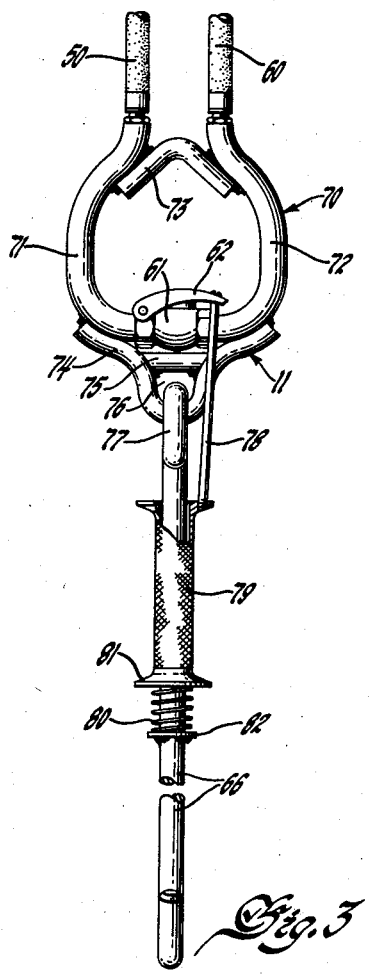
Fig. 3 is an elevation view of a hook structure for a load balancer having a modified form of fluid control mechanism associated therewith.

Fig. 3 shows a fluid control system 70 for motor 4 of a somewhat modified construction. In this construction instead of using standard pipe fittings, a welded or otherwise fabricated structure is employed consisting of a pair of substantially U-shaped pipe sections 71 and 72. The lower ends of pipe sections 71 and 72 are connected to the opposite ends of a valve 61 generally similar to the valve 61 shown in Fig. 1. An inverted V-shaped brace 73 is welded or otherwise secured to pipe sections 71 and 72 near the upper ends thereof and forms a place of attachment for the lower end of cable 8. A flexible fluid pressure supply hose 50 is connected to the upper end of pipe section 71 while a second flexible hose connection 60 connects the upper end of pipe section 72 with motor 4. The lower portions of pipe sections 71 and 72 have secured thereto by welding or otherwise a substantially U-shaped supporting member 74 which in turn has welded or otherwise secured thereto a cross member 75 which forms therewith an opening 76 for receiving the upper hooked end 77 of a load hook 66. A valve operating lever 62 is connected by a rod 78 to the upper flange of a valve operating sleeve 79 slidably mounted on the shank of load hook 66. A coil spring 80 extending between the lower end 81 of sleeve 79 and an annular spring seat 82 welded or otherwise secured to the shank of load hook 66 normally maintains valve 61 in closed position. In this construction in order to lower hook 66 the operator grasps sleeve 79 and urges the latter downwardly against the action of spring 80 thereby opening valve 61 and connecting motor 4 to the source of fluid pressure. When the hook 66 has been lowered and the load attached thereto, sleeve 79 is released and spring 80 then urges the latter and valve lever 62 upwardly thereby closing valve 61. The balancer 1 then functions as previously described in the handling of work pieces.

Figure 4:
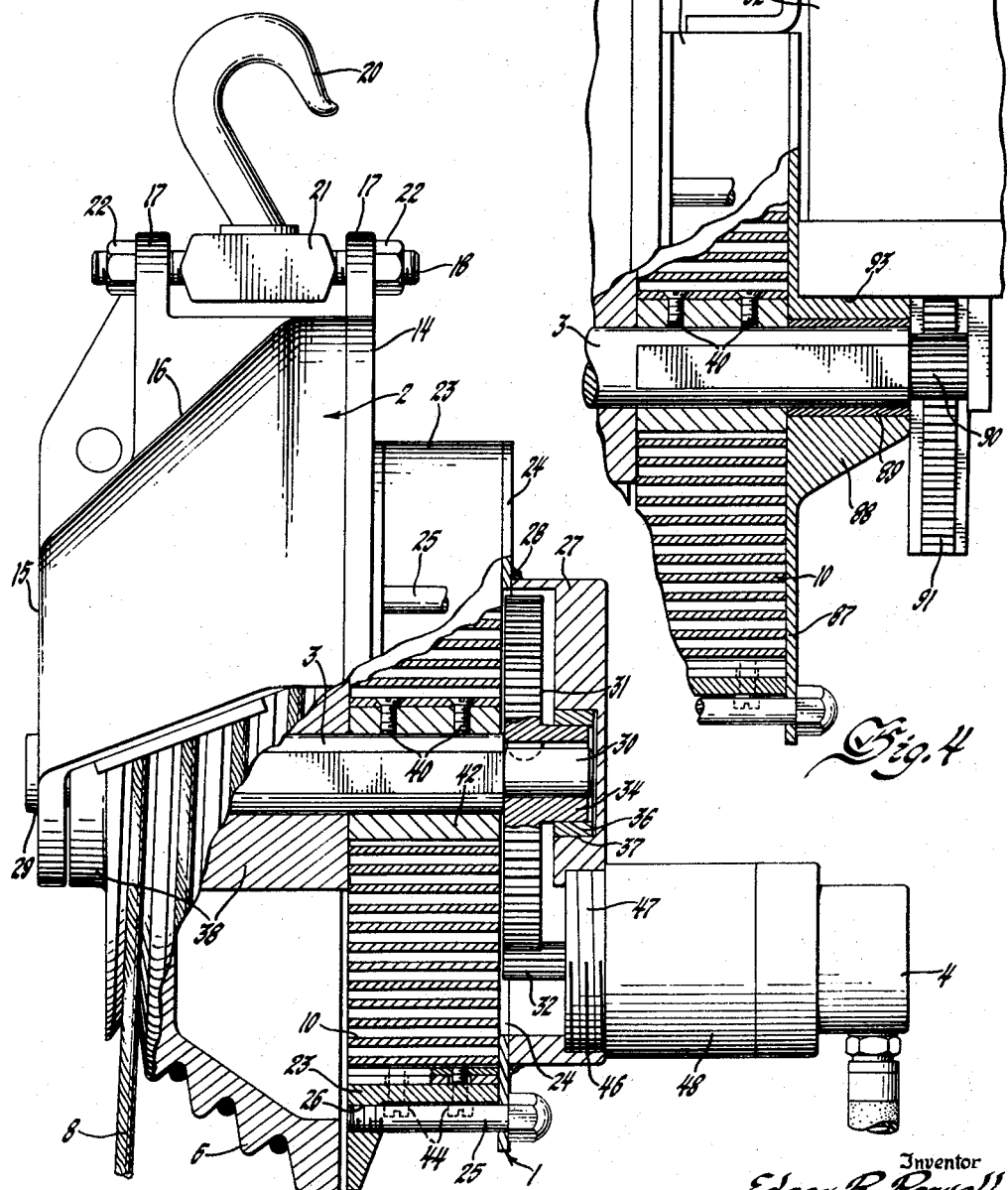
Fig. 4 is a fragmentary view of a load balancer of a modified construction.

Fig. 4 shows a somewhat modified load balancer wherein a reciprocating type of motor 86 is employed for rotating shaft 3 and winding spring 10. In this construction a plate 87 having an extended central bearing portion 88 completely closes the outer side of spring housing 23. Shaft 3 is supported at its right hand end in a bearing 89 provided in bearing portion 88 and has a pinion 90 secured to the outer end thereof which meshes with a rack 91 which forms the piston rod of motor 86. Motor 86 is of the single acting type and the casing 92 thereof is secured in any suitable manner to the upper flat surface 93 of bearing portion 88. The upper end of casing 92 is secured to the housing 23 by means of an L-shaped bracket 94. It is apparent that when motor 86 is connected to fluid pressure it actuates rack 91 which in turn rotates pinion 90 and shaft 3 tending to wind spring 10. Any suitable reel or drum such as the frusto-conical reel 6 in Fig. 2 may be keyed to rotate with the shaft 3. Thus the force of the motor in combination with the weight of the hook and valve assembly will balance the spring tension thus allowing the operator to easily unreel the cable from the drum 6. When the load has been connected to the hook and the air pressure to motor 86 shut off, the spring 10 counterbalances the load and the device as a whole then functions similarly to the construction shown in Figs. 1 and 2.

Figure 5:
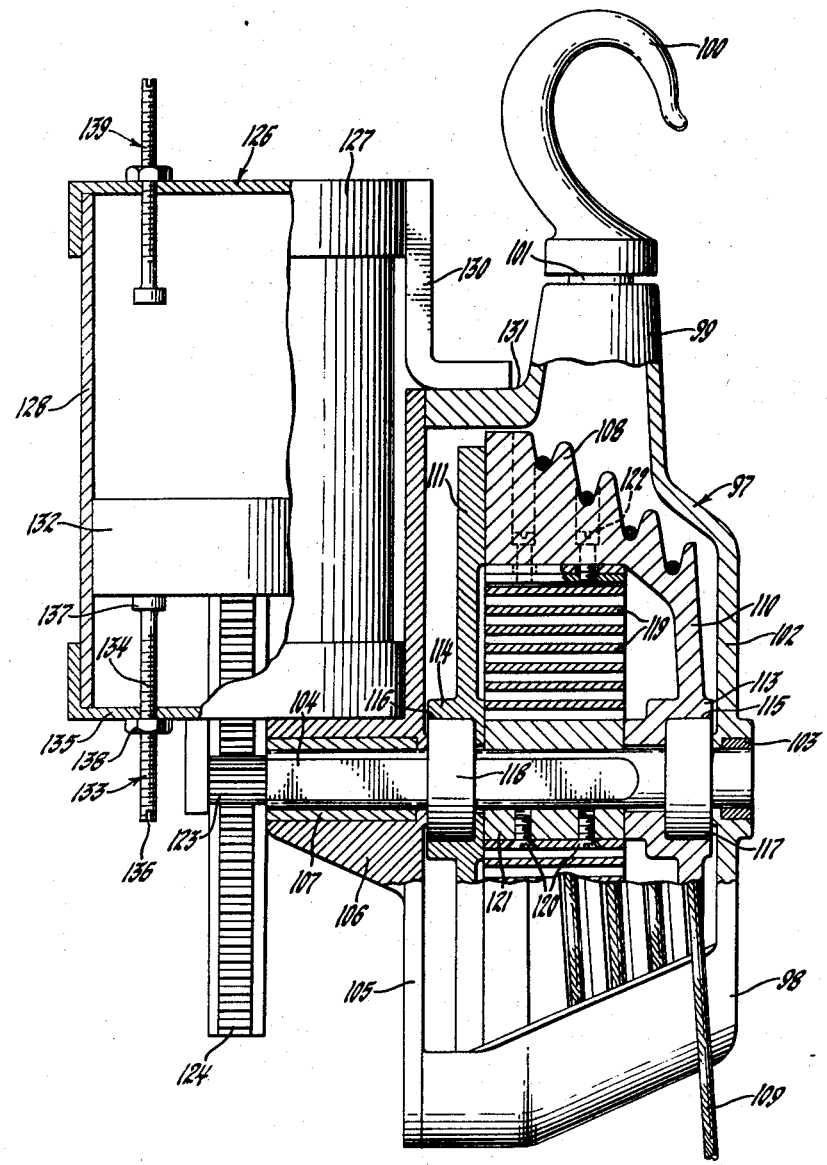
Fig. 5 is a side elevation view partly in section, of a load balancer of a further modified construction.

Fig. 5 shows a further modification of the present invention. In this construction the load balancer 97 comprises a frame 98 which terminates at its upper end in a reduced portion 99 to which the supporting hook 100 is attached by a swivel connection 101. A side plate 102 of frame 98 substantially closes one side of the balancer 97 and has a bearing 103 provided centrally thereof for one end of shaft 104. The other side of the balancer is substantially closed by a plate 105 having an outwardly extending bearing portion 106. A plain bearing 107 is provided in bearing portion 106 for the left hand end of shaft 104. A drum or reel 108 having a cable 109 wound thereon is mounted on shaft 104 between side plates 102 and 105 and frame 98. Drum 108 like the drums 6 previously described, is of frusto-conical construction and has an integral wall 110 at one end thereof and a removable circular plate 111 secured by any suitable means to the other end. Integral wall 110 and plate 111 have enlarged hub portions 113 and 114, respectively, thereon through the aligned openings in which shaft 104 extends. Mounted on shaft 104 and extending into enlarged recesses 115 and 116 in hubs 113 and 114, respectively, are anti-friction bearings 117 and 118. Drum 108 is therefore mounted for relative movement with respect to shaft 104. The inner end of a spiral spring 119 is secured by machine screws 120, or by any other suitable means, to a sleeve 121 secured to shaft 104. The other end of spring 119 is secured by machine screws 122 to the inner surface of drum 108. Shaft 104 is thus effectively connected to drum 108 by means of spring 119.

The outer end of shaft 104 has secured thereon a pinion 123 which meshes with a rack 124 that forms the piston rod of a single acting reciprocating fluid motor 126. The head end 127 of motor 126 may be connected to a control valve 61 by a flexible connection such as those previously described. The lower end of the cylinder 128 of motor 126 is secured by any suitable means to the upper flat surface of the bearing portion 106 of end plate 105. The upper end of cylinder 128 is also secured by means of an L-shaped bracket 130 to the upper end 131 of frame 98.

Normally fluid under pressure is in the upper portion of cylinder 128. This forces the piston 132 downwardly so that it is held against a stop 133 that may be of any suitable construction. The stop shown comprises a threaded shank 134 which cooperates with the threads on the interior of a hole through the cap 135 on the lower end of cylinder 128. A slot 136 suitable for receiving a screw driver is provided in the exterior end of the shank 134 to facilitate rotating same for adjustment. The other end is provided with an enlarged head 137 which intermittently bears against the piston 132. A lock nut 138 may be used to insure any given adjustment being maintained.

As the piston 132 travels downwardly, rack 124 will cause pinion 123 and shaft 104 to rotate. The rotation of the shaft causes the spring 119 to be wound up. It should be noted that if the hook is connected to the load the drum 108 will remain stationary during this operation as this winding action takes place independently of the drum position due to the weight of the load. By properly adjusting the stop 133, the spring tension, when the piston 132 is against said stop, will be correct for balancing the fully loaded hook 66. An upper stop 139 of similar construction is provided at the upper end of the cylinder. This stop 139 is adjusted so that when the piston is at the upper end of the cylinder 128 the spring 119 will be partially unwound to provide a minimum spring tension which will just balance the unloaded hook 66. Because of bearings 117 and 118 and spring 119, the piston 132 and drum 108 can move independently of each other. This allows the piston to travel up and down thereby unwinding or winding the spring without requiring the load hook 66 and its load to be moved. By properly proportioning the balancer, the upper and lower ends of cylinder 128 may operate as the stops.

To lower the unloaded hook 66, the operator grasps said hook thereby actuating the valve lever 62. This valve lever 62 actuates a valve similar to the valve 61 described above except that in this instance the valve is arranged to normally allow fluid under pressure to enter the cylinder and to release the pressure from the cylinder when actuated by the operator grasping the hook 66. Thus when the operator grasps the hook 66 the pressure in the upper end of the cylinder 128 will be exhausted and the spring 119 will tend to unwind and force the piston 132 upward until it strikes upper stop 139 at which point the spring tension will only be sufficient to balance the unloaded hook 66. Since there is a minimum amount of spring tension present, there will be little or no resistance encountered by rotating the drum 108. Therefore, a slight pull on cable 109 will cause the drum 108 to rotate and pay out cable 109 so that hook 66 may be attached to the load. The piston will be held against the stop 139 by the spring tension, and as the drum rotates the shaft 104 will remain stationary. Although the tension of the partially unwound spring will increase slightly as the cable is payed out, a balanced condition will be maintained, due to the conical shape of the drum, for the unloaded hook as long as the piston remains against the upper stop. When the hook 66 is attached to the load, the operator releases the control hook thereby causing valve 61 to allow pressurized fluid to flow into cylinder 128. As this fluid, under pressure, is introduced into the cylinder 128, piston 132 will descend until it strikes stop 133. During this condition, the spring 119 will be wound up to its maximum tension which will balance the fully loaded hook and assembly. Even though the piston travels during this operation, the load may remain stationary as it is not necessary for the drum to rotate to wind the spring. Since the spring tension is sufficient to just balance the load, a relatively light force on said load will permit it to be moved to any desired location. To disengage the hook from the load, the operator actuates the valve lever 62 thereby releasing the pressurized fluid from the cylinder 128. When this occurs, the spring 119 is permitted to expand and force piston 132 upward until it strikes stop 139. As previously described, this will establish a balanced condition for the unloaded hook, thus allowing the operator to easily handle the same. When the operator releases the valve lever 62 the fluid will again flow into the cylinder 128. This operation will wind the spring 119 to maximum tension which in turn will wind up cable 8 until ball stop 8a prevents such action.

From the foregoing description it is apparent that efficient and highly useful load balancers have been devised which enable the handling of various objects with a minimum of physical effort on the part of the operator. In the illustrated embodiments rotary and reciprocating air motors were shown. It is apparent, however, that electric motors with control switches may also be used as well as motors employing liquid pressure without departing from the spirit of the invention. Other modifications and changes in the details of construction may also be made without departing from the invention. It is to be understood therefore that the invention is to be limited only by the scope of the claims which follow.

I claim:

1. A load balancer comprising a supporting frame, a drum rotatably mounted in said frame, a flexible load supporting tension member wound on said drum, load receiving means secured to one end of said tension member, balancing means supported by said frame and operatively connected to said drum and designed to exert a resilient force thereon opposing the tension in said tension member, and motor means supported by said frame and designed when energized to cooperate with said balancing means to exert a different resilient force on said drum opposing the tension in said tension member, one of said resilient forces being of the value required to substantially balance said tension member when it is loaded and the other of said resilient forces being of the value required to substantially balance said tension member when it is unloaded.

2. A load balancer comprising a supporting frame, a drum rotatably mounted in said frame, a load supporting cable wound on said drum, a load receiving hook secured to one end of said cable, balancing means supported by said frame and being operatively connected to said drum to exert a resilient force thereon to oppose the tension in said cable, and motor means supported by said frame, said means being adapted to cooperate with each other to produce a different resilient force on said drum when said motor is energized, one of said resilient forces substantially balancing the tension in said cable when said hook is unloaded and the other of said resilient forces substantially balancing the tension in said cable when said hook is loaded.

3. A load balancer comprising a supporting frame, a shaft rotatably mounted in said frame, a cable winding drum mounted on said shaft, a load supporting cable wound on said drum, a load receiving hook secured to one end of said cable, balancing means supported by said frame and being operatively connected to said drum to exert a resilient torque thereon opposing the tension in said cable, and motor means supported by said frame and being connected to said shaft to exert a torque on said drum, said means being adapted to cooperate with each other to produce a different resilient torque on said drum opposing the tension in said cable when said motor means are energized, one of said resilient torques substantially balancing the tension in said cable when said hook is unloaded and the other of said resilient torques substantially balancing the tension in said cable when said hook is loaded.

4. A load balancer comprising a supporting frame, a cable winding drum rotatably mounted in said frame, a load supporting cable wound on said drum, a load receiving hook secured to one end of said cable, spring means supported by said frame and being operatively connected to said drum to exert a resilient torque thereon that opposes the tension in said cable, and motor means supported by said frame effective to exert a torque on said drum, said means being adapted to cooperate with each other to produce a different resilient torque on said drum opposing the tension in said cable when said motor means are energized, one of said resilient torques substantially balancing the tension in said cable when said hook is unloaded and the other of said resilient torques substantially balancing the tension in said cable when said hook is loaded.

5. A load balancer comprising a supporting frame, a shaft rotatably mounted in said frame, a cable winding drum mounted on said shaft, a load supporting cable wound on said drum, a load receiving hook secured to one end of said cable, a spring supported by said frame and having one end thereof connected to said shaft to exert a torque on said drum opposing the tension in said cable, and a motor supported by said frame and being operatively connected to said shaft to exert a torque on said drum, said spring and said motor being adapted to cooperate with each other to produce a resultant torque on said drum opposing the tension in said cable when said motor is energized, one of said torques substantially balancing the tension in said cable when said hook is unloaded and the other of said torques substantially balancing the tension in said cable when said hook is loaded.

6. A load balancer comprising a supporting frame, a shaft rotatably mounted in said frame, a cable winding drum mounted on said shaft, a load supporting cable wound on said drum, a load receiving hook secured to one end of said cable, a spring supported by said frame and having one end thereof connected to said shaft to exert a force on said drum opposing the tension in said cable, a motor supported by said frame and being operatively connected to said shaft to exert a force on said drum, said spring and said motor being adapted to cooperate with each other to produce a resultant force on said drum opposing the tension in said cable when said motor is energized, one of said forces balancing the tension in said cable when said hook is unloaded and the other of said forces balancing the tension in said cable when said hook is loaded, a hand grip on said hook, control means supported by said hook and being operatively connected to said motor and means in juxtaposition to said hand grip for actuating said control means.

7. A load balancer comprising a supporting frame, a shaft rotatably mounted in said frame, a drum mounted on said shaft and keyed to rotate therewith, a load supporting cable mounted on said drum, a load receiving hook secured to one end of said cable, a counter-balancing spring having one end thereof fastened to said frame and the other end thereof being effective to exert a force on said drum to oppose the tension in said cable, and a motor mounted on said frame and being connected to said shaft and tending to unwind said cable from said drum when said motor is energized, said spring and said motor cooperating to produce one resultant torque on said drum when said motor is energized, said spring and said motor also being adapted to produce a second resultant torque on said drum when said motor is not energized, one of said resultant torques substantially balancing the tension in said cable when it is loaded and the other of said resultant torques substantially balancing said tension in said cable when it is unloaded.

8. A load balancer comprising a supporting frame, a shaft rotatably mounted in said frame, a drum mounted on said shaft and keyed to rotate therewith, a load supporting cable wound on said drum, a load receiving hook secured to one end of said cable, a counter-balancing spring having one end thereof fastened to said frame and the other end thereof being effective to exert a force on said drum to oppose the tension in said cable, and a motor supported by said frame and connected to said shaft, said motor and said spring being adapted to cooperate to exert a resultant force on said drum opposing the tension in said cable when said motor is energized, said spring and said motor also being adapted to cooperate to produce a said second resultant force on said drum, one of said resultant forces tending to substantially balance the tension in said cable when said hook is unloaded and the other of said forces tending to substantially balance the tension in said cable when said hook is loaded.

9. A load balancer comprising a supporting frame, a shaft rotatably mounted in said frame, a drum mounted on said shaft and keyed to rotate therewith, a load supporting cable wound on said drum, a load receiving hook secured to one of said cable, a counter-balancing spring having one end thereof fastened to said frame and the other end thereof being effective to exert a force on said drum to oppose the tension in said cable, a motor supported by said frame, gear means secured to said shaft and driven by said motor, said counter-balancing spring being operatively connected to said motor to produce a resultant force opposing the tension in said cable when said motor is energized, one of said forces balancing the tension in said cable when said hook is loaded and the other of said forces balancing the tension in said cable when said hook is unloaded.

10. A load balancer comprising a supporting frame, a shaft rotatably mounted in said frame, a drum mounted on said shaft and keyed to rotate therewith, a load supporting cable wound on said drum, a load receiving hook secured to one end of said cable, a hand grip on said hook, a counter-balancing spring having one end thereof fastened to said frame and the other end thereof being effective to exert a force on said drum to oppose the tension in said cable, a motor supported by said frame, gear means secured to said shaft and driven by said motor, said counter-balancing spring being operatively connected to said motor to produce a first force opposing the tension in said cable when said motor is energized, one of said forces balancing the tension in said cable when said hook is loaded and the other of said forces balancing the tension in said cable when said hook is unloaded, said load receiving hook having motor control means adjacent said hand grip for energizing said motor.

11. A load balancer comprising a supporting frame, a shaft rotatably mounted in said frame, a drum mounted on said shaft and keyed to rotate therewith, a load supporting cable wound on said drum, a load receiving hook secured to one end of said cable, a hand grip on said hook, a counter-balancing spring having one end thereof fastened to said frame and the other end thereof being effective to exert a force on said drum to oppose the tension in said cable, a motor supported by said frame, a gear means secured to said shaft and driven by said motor, said counter-balancing spring being adapted to cooperate with said motor to produce a resultant force opposing the tension in said cable when said motor is energized, one of said forces substantially balancing the tension in said cable when said hook is loaded and the other of said forces substantially balancing the tension in said cable when said hook is unloaded, a normally closed control valve on said hook for energizing said motor, and a valve actuating member secured to said hook, said member being disposed in juxtaposition and substantially parallel to said hand grip.

12. A load balancer comprising a supporting frame, a shaft rotatably mounted in said frame, a drum mounted on said shaft and keyed to rotate therewith, a load supporting cable wound on said drum, a load receiving hook secured to one end of said cable, a hand grip on said hook, a counter-balancing spring having one end thereof fastened to said frame and the other end thereof being effective to exert a force on said drum to oppose the tension in said cable, a motor supported by said frame, gear means secured to said shaft and driven by said motor, said counter-balancing spring being adapted to cooperate with said motor to produce a first resultant force opposing the tension in said cable when said motor is energized, said motor and said counterbalancing spring being adapted to cooperate to produce a second resultant force when said motor is not energized, one of said resultant forces tending to balance the tension in said cable when said hook is loaded and the other of said resultant forces tending to balance the tension in said cable when said hook is unloaded, said hand grip comprising a sleeve slidably mounted on said load receiving hook, and normally closed valve means operatively connected to said motor, said valve means being actuated by movement of said sleeve on said hook.

13. A load balancer comprising a supporting frame, a shaft rotatably supported in said frame, a drum rotatably mounted on said shaft, a cable wound about said drum, a load receiving hook secured to one end of said cable, a balance means connected to said drum to exert a force on said drum to oppose the tension in said cable, motor means supported by said frame and being connected to said shaft, said motor means when energized being adapted to exert a force on said drum assisting the tension in said cable, said means being adapted to cooperate with each other to produce one resultant torque on said drum when said motor is energized and another resultant torque when said motor is not energized, one of said resultant torques substantially balancing said cable when loaded and the other of said resultant torques substantially balancing said cable when unloaded.

14. A load balancer comprising a supporting frame, a shaft rotatably supported in said frame, a drum rotatably mounted on said shaft, a cable wound on said drum, a load receiving hook secured to one end of said cable, a balance means having one end thereof fastened to said drum and the other end thereof fastened to said shaft, said balance means being positioned to exert a force on said drum to oppose the tension in said cable, a motor means supported by said frame and being operatively connected to said shaft, said means being adapted to cooperate to produce a first resultant force on said drum when said motor is energized and a second resultant force on said drum when said motor is not energized, one of said resultant forces tending to balance the tension in said cable when said hook is unloaded and the other of said resultant forces tending to balance the tension in said cable when said hook is loaded.

15. A load balancer comprising a supporting frame, a shaft rotatably supported in said frame, a drum rotatably mounted on said shaft, a cable wound on said drum, a load receiving hook secured to one end of said cable, a spring having one end thereof fastened to said drum and the other end thereof fastened to said shaft, said spring being positioned to exert a force on said drum to oppose the tension in said cable, a motor supported by said frame, gear means secured to said shaft and driven by said motor, said motor when energized being adapted to cooperate with said spring to produce a first resultant force opposing the tension in said cable, said spring and motor also being adapted to cooperate to produce a second resultant force when said motor is not energized, one of said resultant forces tending to balance the tension in said cable when said hook is loaded and the other of said resultant forces tending to balance the tension in said cable when said hook is unloaded.

16. A load balancer comprising a supporting frame, a shaft rotatably supported in said frame, a drum rotatably mounted on said shaft, a cable wound on said drum, a load receiving hook secured to one end of said cable, a hand grip on said hook, a spring having one end thereof fastened to said drum and the other end thereof fastened to said shaft, said spring being positioned to exert a force on said drum to oppose the tension in said cable, a motor supported by said frame, gear means secured to said shaft and driven by said motor, said motor when energized being adapted to cooperate with said spring to produce a first resultant force opposing the tension in said cable and when not energized to produce a second resultant force, one of said resultant forces tending to balance the tension in said cable when said hook is loaded and the other of said resultant forces tending to balance the tension in said cable when said hook is unloaded, said load receiving hook having motor control means adjacent said hand grip for energizing said motor.

17. A load balancer comprising a supporting frame, a shaft rotatably supported in said frame, a drum rotatably mounted on said shaft, a cable wound on said drum, a load receiving hook secured to one end of said cable, a hand grip on said hook a spring having one end thereof fastened to said drum and the other end thereof fastened to said shaft, said spring being positioned to exert a force on said drum to oppose the tension in said cable, a motor supported by said frame, gear means secured to said shaft and driven by said motor, said motor when energized being adapted to cooperate with said spring to produce a first resultant force opposing the tension in said cable and when not energized to produce a second resultant force, one of said resultant forces tending to balance the tension in said cable when said hook is loaded and the other of said resultant forces tending to balance the tension in said cable when said hook is unloaded, a valve on said hook for energizing said motor, and a valve actuating member secured to said hook, said member being disposed in juxtaposition and substantially parallel to said hand grip.

18. A load balancer comprising a supporting frame, a shaft rotatably supported in said frame, a drum rotatably mounted on said shaft, a cable wound on said drum, a load receiving hook secured to one end of said cable, a hand grip on said hook, a spring having one end thereof fastened to said drum and the other end thereof fastened to said shaft, said spring being positioned to exert a force on said drum to oppose the tension in said cable, a motor supported by said frame, gear means secured to said shaft and driven by said motor, said motor when energized being adapted to cooperate with said spring to produce a first resultant force opposing the tension in said cable and when not energized to produce a second resultant force, one of said resultant forces tending to balance the tension in said cable when said hook is loaded and the other of said resultant forces tending to balance the tension in said cable when said hook is unloaded, said hand grip comprising a sleeve slidably mounted on said load receiving hook, and valve means operatively connected to said motor and actuated by movement of said sleeve.

19. A load balancer comprising a supporting frame, a shaft rotatably supported in said frame, a drum rotatably mounted on said shaft, a load supporting cable wound on said drum, a load receiving hook secured to one end of said cable, a spring having one end thereof fastened to said drum and the other end thereof fastened to said shaft, said spring being positioned to exert a force on said drum to oppose the tension in said cable, a motor supported by said frame and being operatively connected to said shaft, said motor when energized being effective to vary the tension in said spring so as to control the force said spring applies to said drum in opposition to the tension in said cable.

References Cited in the file of this patent

UNITED STATES PATENTS

| | | |
|---|---|---|
| 479,136 | Ethridge | July 19, 1892 |
| 1,447,694 | Stoney et al. | Mar. 6, 1923 |
| 1,459,032 | Norling | June 19, 1923 |
| 1,464,294 | Reese | Aug. 7, 1923 |
| 1,522,047 | Cragun | Jan. 6, 1925 |
| 2,094,182 | Nash | Sept. 28, 1937 |
| 2,246,923 | Meunier | June 24, 1941 |
| 2,342,020 | Stevens | Feb. 15, 1944 |
| 2,481,037 | Pringle | Sept. 6, 1949 |
| 2,570,914 | Buck | Oct. 9, 1951 |
| 2,596,560 | Johnson | May 13, 1952 |
| 2,600,887 | Lannen | June 17, 1952 |
| 2,620,160 | Ray | Dec. 2, 1952 |
| 2,640,113 | Becker | May 26, 1953 |
| 2,646,244 | Sohn | July 21, 1953 |
| 2,680,004 | Herker | June 1, 1954 |

FOREIGN PATENTS

| | | |
|---|---|---|
| 72,501 | Sweden | Aug. 25, 1931 |

UNITED STATES PATENT OFFICE
CERTIFICATE OF CORRECTION

Patent No. 2,939,680                                                 June 7, 1960

Edgar R. Powell

It is hereby certified that error appears in the printed specification of the above numbered patent requiring correction and that the said Letters Patent should read as corrected below.

Column 3, line 37, for "present" read -- preset --; column 8, line 59, for "one of" read -- one end of --.

Signed and sealed this 31st day of January 1961.

(SEAL)
Attest:
KARL H. AXLINE
Attesting Officer

ROBERT C. WATSON
Commissioner of Patents